United States Patent [19]
Nissim et al.

[11] Patent Number: 5,714,403
[45] Date of Patent: Feb. 3, 1998

[54] PROCESS FOR PRODUCING A MATRIX OF "ALL OPTICAL" VERTICALLY-STRUCTURED QUANTUM WELL COMPONENTS

[75] Inventors: Yves Nissim, Paris; Marcel Bensoussan, Boulogne; Jean-Louis Oudar, Chatenay Malabry; Elchuri Rao, Issy Les Moulineaux, all of France

[73] Assignee: France Telecom, France

[21] Appl. No.: 492,951

[22] Filed: Jun. 22, 1995

[30] Foreign Application Priority Data

Jun. 22, 1994 [FR] France .................................. 94 07639

[51] Int. Cl.$^6$ .................................................. H01L 21/20
[52] U.S. Cl. ...................... 437/129; 437/127; 437/133
[58] Field of Search .............................. 437/129, 133, 437/110, 127

[56] References Cited

U.S. PATENT DOCUMENTS

| | | |
|---|---|---|
| 4,795,241 | 1/1989 | Komatsu et al. |
| 5,238,868 | 8/1993 | Elman et al. ............ 437/129 |
| 5,358,897 | 10/1994 | Valster et al. ............ 437/129 |
| 5,376,583 | 12/1994 | Northrup et al. ............ 437/129 |
| 5,500,869 | 3/1996 | Yoshida et al. ............ 437/129 |
| 5,534,444 | 7/1996 | Nissim et al. ............ 437/129 |

FOREIGN PATENT DOCUMENTS 0 248 438   6/1987   European Pat. Off.

OTHER PUBLICATIONS

Nonlinear Optics, vol. 5, No. 1-4, 1993, pp. 171-182.
Applied Physics Letters, vol. 60, No. 5, Feb. 1992, New York, pp. 607-609.
Applied Physics Letters, vol. 64, No. 7, Feb. 1994, New York, pp. 869-871.
Applied Physics Letters, vol. 49, No. 9, Sep. 1986, New York, pp. 510-512.

*Primary Examiner*—Kevin Picardat
*Attorney, Agent, or Firm*—Blakely Sokoloff Taylor & Zafman

[57] ABSTRACT

This invention relates to a process for producing a matrix of "all optical" vertically-structured quantum well components.

This process consists in the encapsulation of a half-structure constituted by a lower mirror (2) and an active zone (3) partially covered by a self-alignment mask (4) with a negative dielectric layer (7) whose thickness is given by the Bragg condition at the working wavelength. The encapsulated half-structure is thermally treated to induce an alloy interdiffusion (9) in the non-covered parts of the active zone, and covered with one or several negative and positive layers (10,11) so as to complete the upper Bragg mirror.

8 Claims, 3 Drawing Sheets

PROCESS FOR PRODUCING A MATRIX OF "ALL OPTICAL" VERTICALLY-STRUCTURED QUANTUM WELL COMPONENTS

TECHNICAL FIELD

This invention relates to a process for producing a matrix of "all optical" vertically-structured quantum well components, which said components are formed of compound III/V-based quantum well heterostructures lying between an upper mirror and a lower mirror whose thickness is determined by the Bragg relation at the working wavelength.

BACKGROUND OF THE INVENTION

It is known that, owing to their matrix configuration (parallelism), these devices are often necessary for increasing the rate in optical signal treatment.

The individual components, in the form of pixels, are made up of a vertical cavity (perpendicular to the plane of the sample surface) lying between a lower and an upper mirror. The cavity contains quantum wells produced by an alternation of semiconductor composite materials. The mirrors possess a very high degree of reflectivity and are constituted of alternations of semiconductor or dielectric layers whose thickness is determined by the working wavelength of the component according to Bragg conditions. The active zone of this component is excited optically.

In this family of vertically-structured quantum well components in the form of a matrix, mention may be made of optical gates composed of bistables, surface emission lasers, amplifiers or modulators, all of which are optically evacuated.

The manufacture of this kind of device and its monolithic integration in micro-optoelectronics involves the need to be able to vary, in the same plane, the properties of the material so as to produce laterally either localized optical confinement, or electronic confinement, or optical absorption, or a combination of all three. The techniques for manufacturing these structures are very complex at the present time, a fact which weighs heavily in the cost of the final device.

The possibilities of "epitaxiated" thin layer growth offered by modern techniques have without doubt broadened the scope for obtaining quantum well heterostructures for semiconductor devices in micro-optoelectronics. It is now possible to control a thin layer growth to the nearest atomic monolayer. Quantum wells of a high quality are thus obtained with very abrupt interfaces where, thanks merely to a geometric parameter (well thickness and/or insertion in the well of an atomic plane different from the matrix during growth), it is possible to produce, in the same family of material (same growth base, same cells, same conditions of growth), the property required (forbidden band, oscillator strength, etc.) for the desired application. However, this engineering provides access only to 2D (two-dimensional) properties, i.e. to quantification properties along the growth axis.

The matrixing of micro-optoelectronic components to produce 3D (three-dimensional) patterns from these heterostructures consists of shaping the structure laterally. This is usually obtained by a succession of technological stages depending on the component which it is wished to produce: masking, etching, epitaxy recovery, passivation, etc. These technologies apply to vertically-structured components where it is a question of putting in close contact fairly similar materials (possessing nonetheless differentiated electrical and optical properties) in order to carry out a vertical electrical and optical confinement.

There are at present two techniques for making matrixes of vertically-structured quantum wall components (pixels):

The pixel matrix may be produced by lithography and reactive ionic etching. In this case, the implementation is lengthy (ionic etching at a depth of several microns of a material constituted of several layers of different type), the structure is no longer planar, and lastly the pixel sides require a passivation which has yet to be mastered.

The pixel matrix may be obtained by disordered alloy induced by ion implantation according to B. G. Sfez et al, Appl. Phy. Lett. 60, 607, 1992. In this case, manufacturing is costly (implanter); moreover, it is necessary to use a complementary system to locate the pixels (e.g. luminescent cartography), because the implantation mask defining the position of the pixels has to be removed before proceeding to the next technological stages.

Finally, the ionic implantation technique introduces structural defects and impurities into the implanted regions, which said defects and impurities are detrimental to the preservation of the optical properties of the structures.

It is also known that defects may be induced under an encapsulant which is often a silicium-based dielectric.

D. G. Deppe et al. "Strippe-Geometry Quantum Well Heterostructure AlGaAs Lasers Defined by Defect Diffusion", Appl. Phys. Lett. 49, 510, 1986 and L. J. Guido et al. "Effects of Dielectric Encapsulation and As Overpressure on Al-Ga Interdiffusion in AlGaAs-GaAs Quantum Well Heterostructures", J. of Appl. Phys., 61, 1327, 1987, have described lasers based on quantum well heterostructures in the form of a layer of quantum well heterostructures covered with parallel bands of $Si_3N_4$ encapsulated under a dielectric layer which locally induces, by annealing, a disordered alloy in the layer of heterostructures.

SUMMARY OF THE INVENTION

It was unexpectedly discovered that it was possible to use this technique of encapsulation by a dielectric for the purposes of producing matrixes of "all optical" vertically-structured quantum well components.

Compared to the prior art, the invention proposes a process which makes use of a dielectric encapsulant, not only for producing 3D patterns by introducing (or not introducing) alloy disorder, but also for passivating the entire surface of the semiconductor sample, also as a self-aligning factor of the structures, and as part of the exterior mirror contributing to the constitution of the component.

The invention concerns a process such as that mentioned above, characterized in that:

in accordance with Bragg conditions, the upper side of a half-structure is encapsulated with a negative dielectric layer whose thickness corresponds to half the working wavelength of the device. This half-structure is made up of:

a) a lower mirror consisting of one or several alternations of semiconductor layers, "epitaxiated" on a semiconductor substrate, b) an active zone consisting of quantum well heterostructures "epitaxiated" on the preceding mirror, c) said active zone being partially covered by a self-alignment mask, functioning as a positive layer, etched in the form of points in such a way that it demarcates in matrix form the regions of the upper face of the active zone which are covered, and the regions which are not covered, with respect to the recesses due to the etching of the mask.

The encapsulated half-structure is treated thermally at an appropriate temperature, e.g. at 850° C. for 4 hours, in order to induce alloy disorder in the parts of the active zone whose upper side is not covered by the etched mask and thus to form the corresponding pixel matrix in the active zone, and then to ensure the transfer to the active zone of the mask, the negative layer may, if necessary, be covered by one or several alternations of dielectric layers of different refractive index, identical or not to the previous layers.

The number of alternations is optimized in function of the reflectivity desired for the upper mirror thus constituted; to ensure maximum reflectivity the total number of layers must correspond to an even number.

The process according to the invention makes it possible to produce at one and the same time:

a localized interdiffusion in the quantum well heterostructure defining pixels in the non-modified active zones, the first layers of an upper mirror which are obtained by depositing dielectric layers of different refractive index whose thickness is calculated by the working wavelength according to Bragg conditions compatible with the thickness ranges necessary to induce, or not to induce, the alloy blend, the passivation of the entire surface of the sample by dielectric layers, the pixelised regions using the Bragg mirror as protection, the other regions being covered according to the invention with a dielectric inducing the alloy blend, and the dielectric thickness in these regions being chosen from the thickness range inducing the blend which is compatible with a passivation of the semi-conductor.

The structure thus obtained is now compatible with all annealing conditions (even over a long period and at high temperature) without, for example, the need for controlled atmosphere with hydrides ($AsH_3$, etc.).

For example, the thickness of $SiO_2$ necessary to induce a total alloy interdiffusion of a quantum well GaAs/GaAlAs (850° C./4 hours) is in the region of 4000 Å.

This process also makes it possible to vary the degree of interdiffusion between 0 and 100% in the modified (non-pixelised) regions in order to optimize the electrical or optical adaptation between modified and non-modified zones.

According to a variation to be described hereafter, the process also makes it possible to obtain pixels of submicronic sizes.

The expression "negative layer" is understood to mean a dielectric thin layer which is deposited on the quantum well heterostructure and which causes a modification in the composition of this structure after annealing at depths of several microns. The layer might be of type $Si_xO_y$ or possibly $SiO_xN_y$, y being small enough to enable the $SiO_xN_y$-based layer to behave as a negative layer. Trade specialists are familiar with these layers. Layers of this kind deposited by RTCVD are appropriate.

The expression "positive layer" is understood to mean a dielectric thin layer which, when deposited on a quantum well heterostructure, does not cause a modification in the composition of this heterostructure after annealing identical to that mentioned above. The layer might be of type $Si_xO_y$ or possibly $SiO_xN_y$, with y, in the latter case, being small enough to enable the $SiO_xN_y$-based layer to behave as a positive layer. Trade specialists are familiar with these layers.

The degree of blend induced by a negative layer may vary according to the mechanical tension induced by the dielectric film on the layer. This mechanical tension depends partly on the composition of the layer and partly on its thickness.

The materials capable of performing this modulation are described, notably in French Patent 2 605 647.

The manufacturing of a part of the upper mirror of the components is obtained by depositing dielectric layers whose thickness is calculated at the working wavelength as a Bragg thickness compatible with thickness ranges necessary to induce, or not to induce, the alloy blend.

The quantum well thin layers are binary, ternary or quaternary GaAs or InP-based III–V materials.

Among these suitable heterostructures in the context of this invention, mention may be made of the alternations of layers formed from the structure $GaAs/Ga_{1-x}Al_xAs$ with $0 \leq x \leq 1$. But the process may be extended to other types of heterostructures, $GaAs/Ga_{1-x}In_xAs$ with $0 \leq x \leq 1$ or $InP/In_xGa_{1-x}As/In_xGa_{1-x}As_yP_{1-y}$ with $0 \leq x \leq 1$ and with $0 \leq y \leq 1$.

The following heterostructures may, for example, be cited:

for the lower mirror: 14 $AlAs/Al_{0.1}Ga_{0.9}As$ periods, for the active layer: 130 $GaAs/Ga_{0.7}Al_{0.3}As$ periods (10 nm of thickness for each layer).

The deposition of the quantum well active zone on the lower mirror is obtained by epitaxy in the standard manner, i.e. by the growth of a monocrystalline layer.

Standard photolithographic and etching techniques are used to produced the desired geometry of the self-alignment mask of the positive layers.

Once the negative layer has been deposited, the sample thus obtained is treated thermally by submitting it to a given annealing temperature, for a determined period, depending on the desired energy shift of the forbidden band.

The two annealing types used are respectively rapid annealing by halogen lamp and conventional annealing in a standard oven. Fast annealing is characterized by very short temperature-rise times, with a temperature of 850° C. being reached in approximately 10 seconds (i.e. about 100° C./sec), and by thermal treatment temperature stages ranging from 0 to a score or so of seconds. Temperature-rise times for conventional annealing are of the order of 5 minutes with stages ranging from 0 to several scores of minutes.

The annealing phase is usually carried out at a temperature of about 850° C. for the GaAs/GaAlAs system.

This method leads to the transfer of the patterns of the self-alignment mask to the active layers and allows the production of vertical structures (pixels) through an optical and electrical confinement which is essential in the matrix monolithic integration of the different components. The local variation of the index between modified and non-modified zones may attain values of the order of $10^{-2}$, ensuring optical lateral confinement in the pixel provided that the lateral dimensions are not too small (pixel diameter $\leq 2$ micrometers).

In order to produce smaller (micronic and submicronic) pixels, it is necessary to focus the incident light at the center of the cavity so as to provide greater optical confinement. The beam waist of the beam is focused at the interior of the cavity and the ultimate pixel diameter may be estimated by taking the equations used in the manufacture of lasers with a flat mirror and a spherical mirror:

$$W_0 = (ld/2p)^{1/2} \ (R^2/d \ (R-d))^{1/4}$$

with $W_0$: waste beam;

d: length of the cavity (pixel depth);

R: curvature radius of the spherical mirror (lens), and l: working wavelength.

A straightforward numerical application shows that, for a pixel of d=2 μm deep, a lens of R=15 μm curvature radius, at l=0.85 μm, the diameter of the pixel may be reduced to a submicronic size.

Generally, the upper mirror of this structure may be fabricated by means of dielectric thin layers. In fact, the index variations between these different layers make it possible to produce mirrors of high reflectivity at any wavelength with little alternation of layers. For example, with the use of an $SiO_2$ (n=1.45/$Si_3N_4$ (n=2.1) alternation, a reflectivity of 96% may be obtained with only four bilayers. This same value of reflectivity may be obtained with only two bilayers by using an alternation of $SiO_2$ (n=1.45/Si (n=3.5). The materials are chosen in function of their optical properties and of the working wavelength.

In a variation of the process according to the invention, each point is made up of a positive layer presenting a curvature such as to form a focusing lens of the incident light at the center of the cavity on the first layers of the dielectric mirror.

This makes it possible to obtain pixels of submicronic size.

Other characteristics and advantages of this process will become apparent from the description which follows. This description is purely for purposes of illustration and is in no way restrictive. It is to be read in conjunction with the attached drawings in which:

DETAILED DESCRIPTION

In FIGS. 1a to 1d, 1 is the reference for the substrate, 2 for the lower mirror of such a heterostructure and 3 for the quantum well layers.

The lower mirror is made up of twenty alternations of two semiconductor layers whose indices are slightly different (GaAs/Al/$_x$Ga$_{1-x}$As).

The growth of quantum well III/V semiconductor layers 3 on the mirror 2 itself "epitaxiated" on the substrate 1 was carried out either by thermal decomposition of element III polyalkyle and of element V polyalkyle, or by thermal decomposition of element III polyalkyle and of hydrogenated compounds of element V, or by other standard methods.

According to this example, the "epitaxiated" quantum well heterostructure is constituted of GaAs/GaAlAs alternations.

A dielectric layer 4 of type SiN (positive) and of 0.1 μm thickness according to Bragg conditions at l=0.85 μm is deposited on the quantum well layers 3.

The deposit is, for example, a light assisted chemical deposit (RTCVD).

Figure 1A:
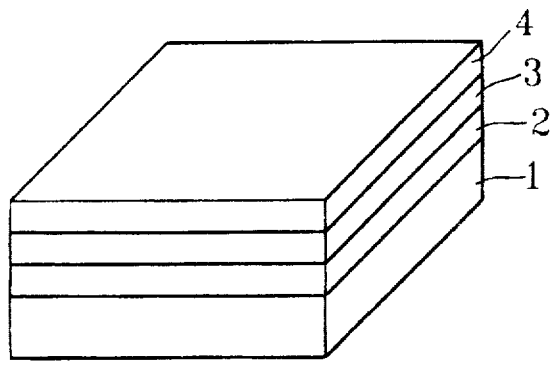
FIGS. 1a to 1d illustrate a general implementation of the process in conformity with the invention.
Figure 1B:
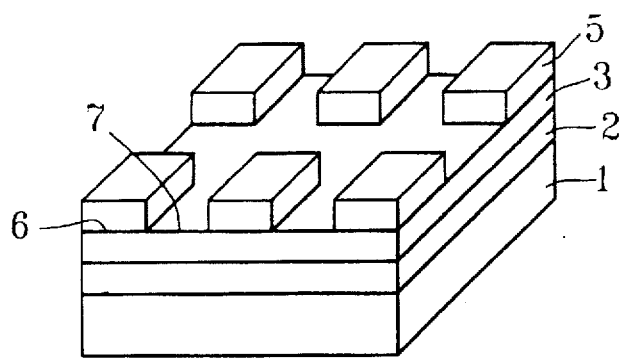

This positive dielectric layer is etched by photolithography and etching in such a way as to form a matrix N×N of equidistant points 4 (FIG. 1b) so that the etched mask formed by the points marks off the regions 5 of the upper side of the quantum well layer 3 covered by said points and the non-covered regions 6 in respect of the recesses resulting from the etching (FIG. 1b).

Figure 1C:
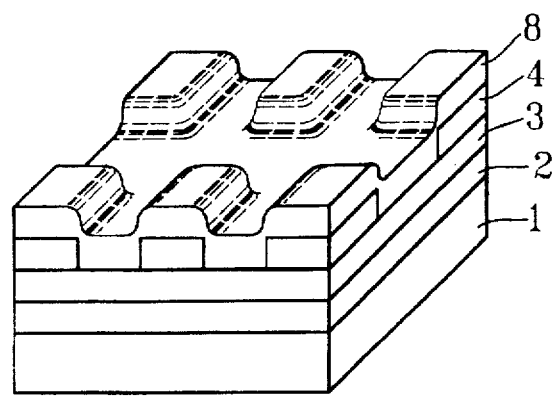
Figure 1D:
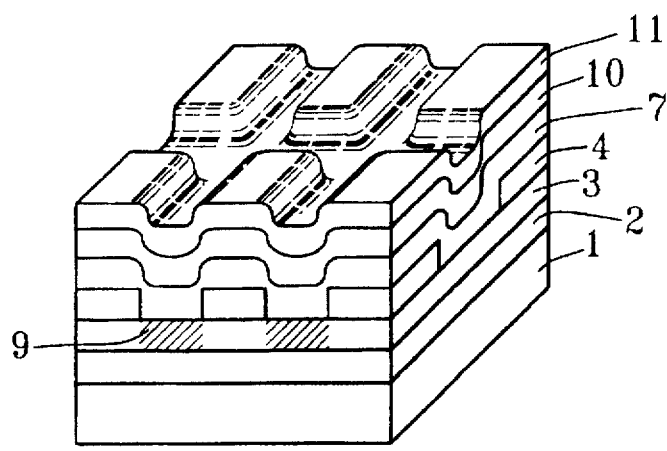

According to the method used for the positive layer, the half-structure of a dielectric layer 7 of type $Si_xO_y$ (preferably SiO), of thickness 4360 Å corresponding to a thickness calculated according to Bragg conditions and sufficiently thick to induce a substantial alloy blend, is encapsulated (FIG. 1c).

For a working wavelength of 850 nm, the Bragg thickness must be 4360 Å corresponding to k=1. Referring to the Bragg formula for a normal index at the surface of the sample:

$$E = l/4n + k \ l/2n$$

Alloy rediffusion annealing now takes place (850° C./4 hours) leading to an alloy blend in the regions 9 in contact with the layer of type SiO and to the pixel matrix 8 corresponding to the level of the regions 5 covered with said points.

The Bragg mirror is then completed by depositing successively another positive layer 10 and a negative layer 11, the pixelised structure being automatically aligned.

Figure 2A:
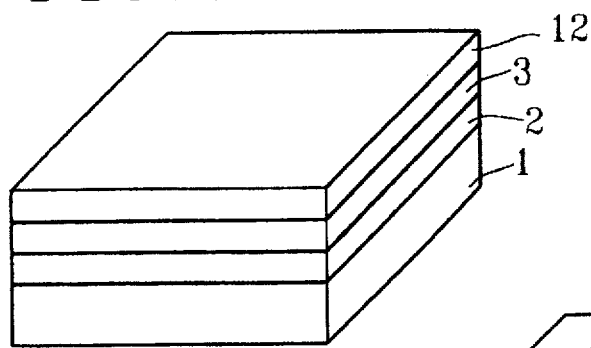
FIGS. 2a to 2e illustrate a variation in the implementation of the process in conformity with the invention.

According to the variation illustrated in FIG. 2, an SiN-type (positive) layer 12, not corresponding to a thickness calculated according to Bragg conditions, is deposited on the whole of the sample surface (FIG. 2a).

Figure 2B:
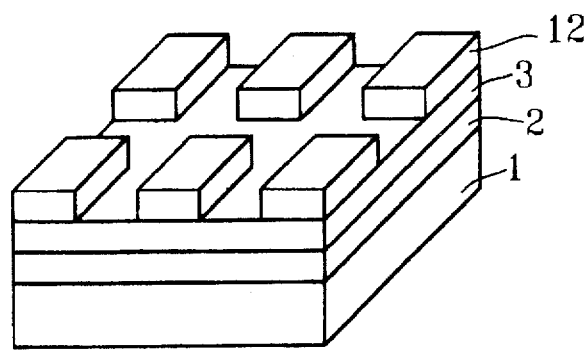

This layer is etched, by lithography or etching, in such a way as to leave only the pixel surface covered (FIG. 2b).

Figure 2C:
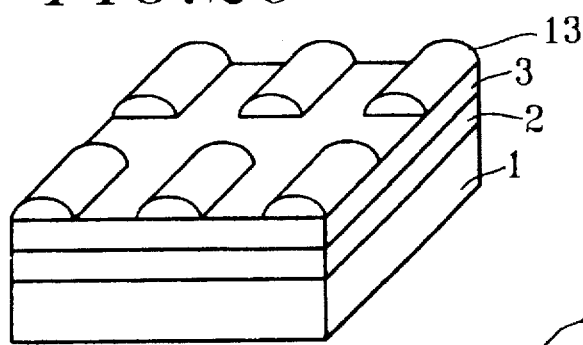

A curvature 13 is performed, this curvature being determined on the SiN points and making it possible to produce a lens effect which focuses the incident light at the center of the cavity (FIG. 2c). Two variations may be used for this purpose:

The sample is mounted on a revolving stage which is inclined in relation to the incidence of a reactive ion beam. The inclination makes it possible to adjust the lens curvature radius.

The curvature is carried out by a series of masking and etching levels by RIE on the edge of these layers with progressively smaller masks.

As from this stage, the reflectivity phase on the pixel is optimized.

Figure 2D:
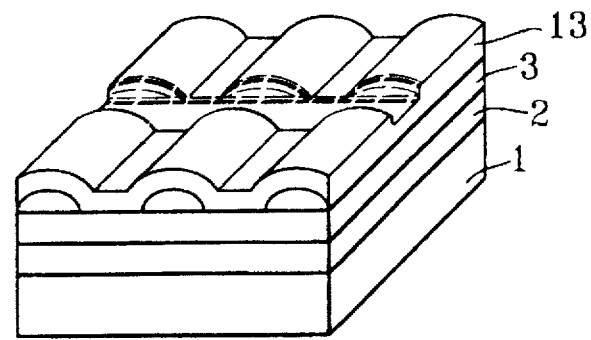

An SiO-type (negative) layer 14 is deposited on the entire etched and machined surface. The thickness of this layer must correspond to a thickness calculated in accordance with Bragg conditions and must be sufficiently thick to induce a substantial alloy blend (FIG. 2d).

The thickness according to Bragg conditions is thus: E=l/4 n+k l/2 n and E>4000 Å, giving a working wavelength of 850 nm, E=4360 Å corresponding to k=1.

Figure 2E:
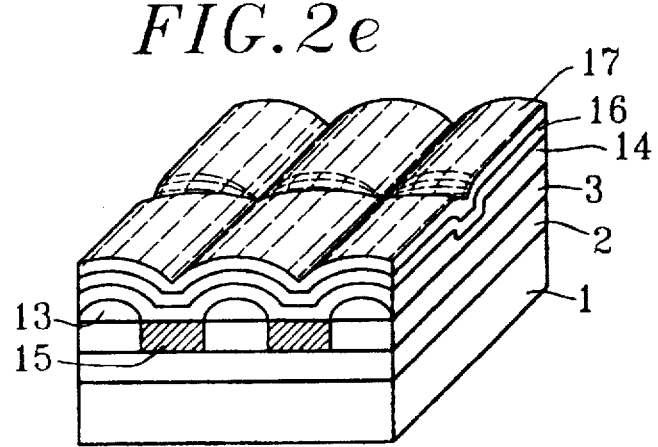

Alloy rediffusion annealing now takes place at a temperature of about 850° C. for 4 hours, with only the regions 15 under the SiO-type layer being remixed (FIG. 2e).

The dielectric Bragg mirror is now completed by the deposit of an SiN layer 16, then an SiO layer 17, the pixelised structure being automatically aligned.

Figure 3A:
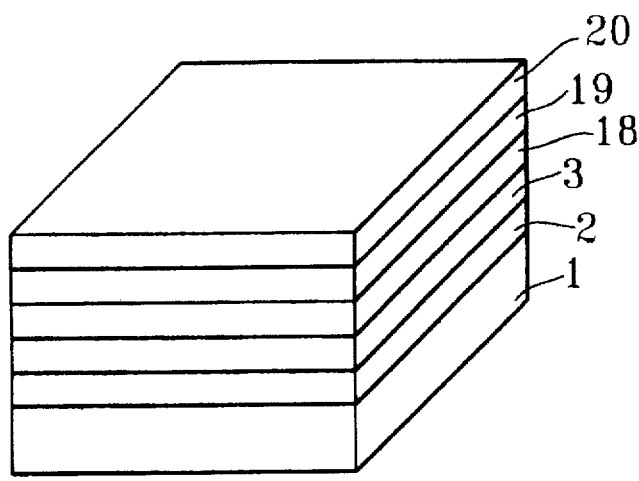
FIGS. 3a to 3c illustrate a second variation in the implementation of the process in conformity with the invention.
Figure 3B:
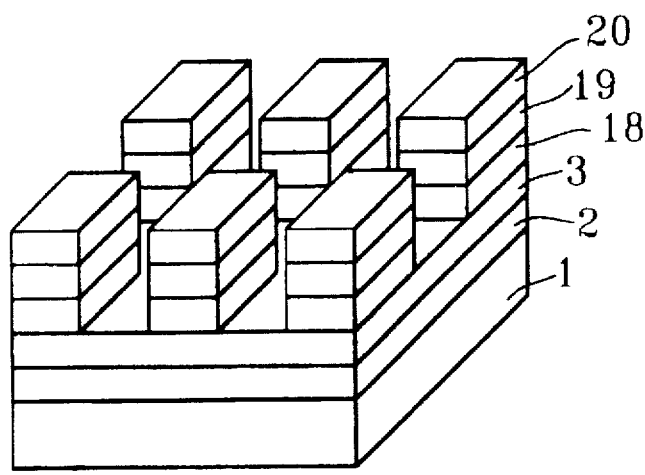
Figure 3C:
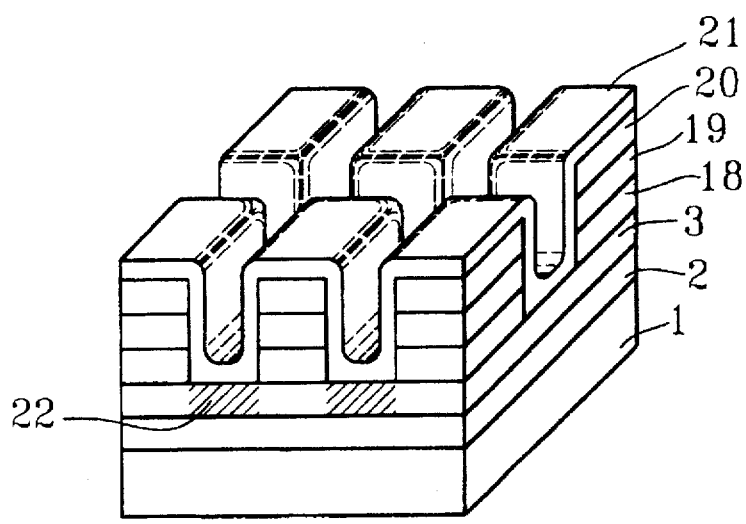

According to a third variation referred to in FIG. 3, three layers are successively deposited on the whole of the surface of the quantum well layer 3. The thickness of these three layers corresponds to a thickness calculated according to Bragg conditions: an SiN layer 18 (positive layer), an SiO layer (negative layer), and an SiN layer 20 (positive layer). As before, the mirror is etched by lithography so as to define points (FIG. 3b).

The last SiO layer 21 as defined above (negative layer) of the mirror is deposited, and then the mixture is annealed (850° C./4 hours).

The thickness of this said layer must correspond to a thickness calculated according to Bragg conditions and must be sufficiently thick to induce a substantial alloy blend 22.

The Bragg thickness is thus: E=l/4 n+k l/2 n and E>4000 Å, giving a working wavelength of 850 nm, E=4360 Å corresponding to k=1.

After this stage, the reflectivity intensity on the pixel is at its maximum. The phase of this reflectivity is also optimized on the pixel by means of the lens effect obtained with this layer which must go round the existing patterns.

We claim:

1. A process for producing a matrix of vertically structured quantum well components, in "all optical" function, made up of compound III/V-based quantum well heterostructures, lying between two Bragg mirrors, characterized in that:

the upper side of a half-structure is encapsulated with a negative dielectric layer (7), the thickness of this layer being given by the Bragg condition at the working wavelength, this half-structure is composed of:
   a) a lower mirror (2) itself composed of one or several alternations of semiconductor layers, "epitaxiated" on a substrate (1),
   b) an active zone (3) made up of quantum well heterostructures, "epitaxiated" on the previously mentioned mirror,
   c) said active zone being partially covered by a self-alignment mask (4), functioning as a positive layer, etched in the form of points in such a way that it demarcates in matrix form the regions (5) of the upper side of the active zone which are covered, and the regions (6) which are not covered with respect to the recesses due to the etching of the mask, the encapsulated half-structure is treated thermally at an appropriate temperature in order to induce alloy disorder (9) in the parts of the active zone whose upper side is not covered by the etched mask, and thus to form the corresponding pixel matrix (8) in the active zone, and then to ensure the transfer of the mask to the active zone, the negative layer may, if necessary, be covered by one or several alternations of dielectric layers (10,11), of different refractive index, wherein to ensure maximum reflectivity the total number of layers must correspond to an even number.

2. A process according to claim 1, characterized in that the quantum well layer is a binary, ternary or quaternary GaAs or InP-based III–V semiconductor.

3. A process according to claim 2, characterized in that the quantum well active layer is of the type $GaAs/Ga_{1-x}Al_xAs$ with $0 \leq x \leq 1$, or $GaAs/Ga_{1-x}In_xAs$ with $0<x<1$ or $InP/In_xGa_{1-x}As/In_xGa_{1-x}As_yP_{1-y}$ with $0 \leq x \leq 1$ and with $0 \leq y \leq 1$.

4. A process according to claim 1, characterized in that the positive layer is of type $Si_xN_y$ or possibly $SiO_xN_y$, with y, in the latter case, being small enough to enable the $SiO_xN_y$ based layer to behave as a positive layer.

5. A process according to claim 1, characterized in that the negative layer is of type $Si_xN_y$ or possibly $SiO_xN_y$, with y being small enough to enable the $SiO_xN_y$ based layer to behave as a negative layer.

6. A process according to any preceding claim, characterized in that each point is constituted of a positive layer presenting a curvature so as to form a focusing lens of the incident light at the center of the active layer of the pixels.

7. A process according to claim 6, characterized in that the thickness of the positive layer is less than a thickness calculated according to Bragg conditions.

8. A process according to one of claims 1 to 5, characterized in that each point is made up, from the upper side of the covered region, of a positive layer, a negative layer and another positive layer, these said layers all having a thickness equal to a thickness calculated according to Bragg conditions.

* * * * *